United States Patent
Kristensen

(10) Patent No.: US 9,749,315 B1
(45) Date of Patent: Aug. 29, 2017

(54) MOBILE ROOT TRUST DEVICE

(71) Applicant: ViaBlitz Inc., Kirkland, WA (US)

(72) Inventor: Jari Kristensen, Kirkland, WA (US)

(73) Assignee: VIABLITZ INC., Kirkland, WA (US)

( * ) Notice: Subject to any disclaimer, the term of this patent is extended or adjusted under 35 U.S.C. 154(b) by 151 days.

(21) Appl. No.: 14/875,027

(22) Filed: Oct. 5, 2015

Related U.S. Application Data

(60) Provisional application No. 62/059,811, filed on Oct. 3, 2014.

(51) Int. Cl.
*H04L 29/00* (2006.01)
*H04L 29/06* (2006.01)

(52) U.S. Cl.
CPC ...... *H04L 63/0853* (2013.01); *H04L 63/0442* (2013.01); *H04L 63/061* (2013.01); *H04L 63/0823* (2013.01)

(58) Field of Classification Search
CPC ............ H04L 63/08; H04L 9/32; G06F 21/60
See application file for complete search history.

(56) References Cited

U.S. PATENT DOCUMENTS 8,769,612 B2 * 7/2014 Ganapathy ............ H04W 12/06
380/247

* cited by examiner

*Primary Examiner* — Izunna Okeke
(74) *Attorney, Agent, or Firm* — FSP LLC

(57) ABSTRACT

A method of conferring security trust and privileges between proximally positioned devices in the presence of a root trust device includes configuring a microprocessor to activate at least one wireless communications module to receive a unique environmental signal (UES) and a proximally positioned device's unique device identifier (UDI) in response to detecting a threshold charge capacity in a battery during its initial charging, imprinting a primary device asymmetric key pair, the UDI, and the UES as a primary device pairing event, transmitting a primary device certificate to the proximally positioned device, encrypting device content on the proximally positioned device by multiplexing a device content signal with an asymmetric key, and decrypting the device content on another proximally positioned device using a corresponding asymmetric key from a shared certificate while in the presence of the root trust device.

12 Claims, 15 Drawing Sheets

MOBILE ROOT TRUST DEVICE

CROSS-REFERENCE TO RELATED APPLICATIONS

This application claims priority and benefit under 35 U.S.C. 119 to U.S. application Ser. No. 62/059,811 filed on Oct. 3, 2014, which is incorporated herein by reference in its entirety.

BACKGROUND

In cryptography, a certification authority (CA) is an entity that issues digital certificates. The digital certificate certify the ownership of a public key by the named subject of the certificate. This allows others (relying parties) to rely upon signatures or assertions made by the private key that corresponds to the certified public key. In this model of trust relationships, a CA is a trusted third party that is trusted by both the subject (owner) of the certificate and the party relying upon the certificate. CAs are characteristic of many public key infrastructure (PKI) schemes.

A digital certificate includes information about the key, information about its owner's identity, and the digital signature of an entity that has verified the certificate's contents are correct. If the signature is valid, and the person examining the certificate trusts the signer, then they know they may use that key to communicate with its owner.

In a typical public-key infrastructure (PKI) scheme, the signer is a certificate authority (CA). In a web of trust scheme, the signer is either the key's owner (a self-signed certificate) or other users ("endorsements") whom the person examining the certificate might know and trust.

Certificates are an important component of Transport Layer Security (TLS, sometimes called by its older name SSL), where they prevent an attacker from impersonating a secure website or other server. They are also used in other important applications, such as email encryption and code signing.

PKI (Public Key Infrastructure) is an arrangement that binds public keys with respective user identities by means of a certificate authority (CA). The user identity must be unique within each CA domain. The third-party validation authority (VA) may provide this information on behalf of CA. The binding is established through the registration and issuance process, which, depending on the assurance level of the binding, may be carried out by software at a CA or under human supervision. The PKI role that assures this binding is called the registration authority (RA), which ensures that the public key is bound to the individual to which it is assigned in a way that ensures non-repudiation.

While third party CAs offer many security advantages, they suffer from several limitations. Some of these limitations include the fact that they are not based on personal relationships and interaction such as face to face interactions. Historically, personal relationships have been the basis of most webs of trust between humans. Without the ability of establishing a web of trust based on personal relationships, a digital certificate may be distributed to individuals that a distributing agent has never personally met.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
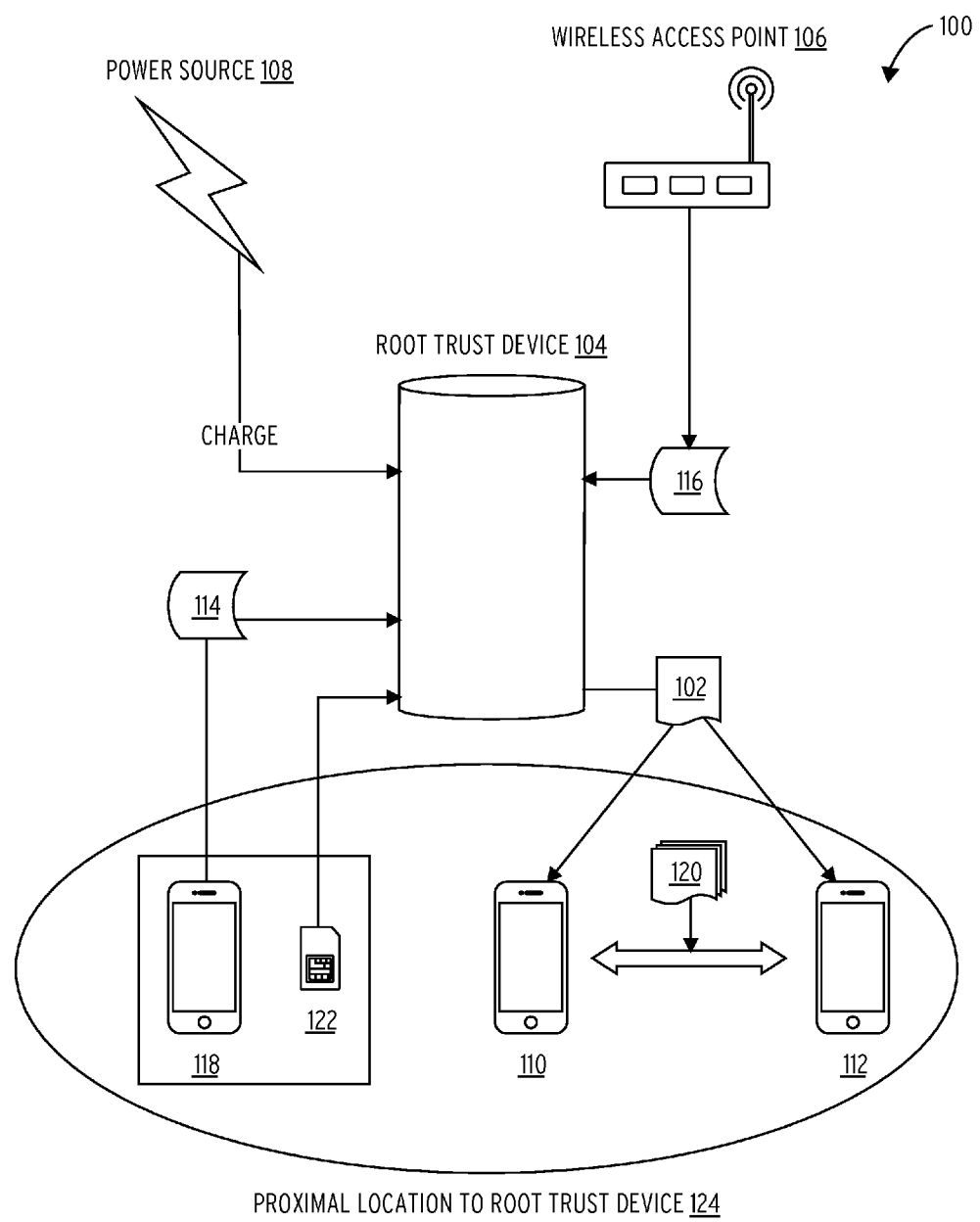
FIG. 1 illustrates an embodiment of the proximity based security certificate management system 100.

"Initial Configuration Logic" in this context refers to logic stored within memory that configures the microprocessor of the root trust device to detect a minimum threshold charge capacity during a battery's initial charging, activate a wireless communications module to communicate with nearby devices, collect a unique environmental signal, and imprint to memory the details of the pairing event.

"Initial Configuration State" in this context refers to state of a root trust device that sets first pairing event during the state as a primary device pairing event establishing a primary device and permanently imprinting the specifics of the event to the root trust device's memory. The initial configuration state establishes a permanent trust between the primary device and the root trust device.

"Pairing" in this context refers to process of associating two devices with each other. During the pairing process, identifying information that is unique to each device is stored in the paired device. After devices have been paired, they can automatically identify each other during future communication sessions. Device pairing may occur during the first attempted use of the device with another devei, or it may be manually performed through the selection of codes or switches located on or in the device. To initiate the pairing process, one or both devices must enter a pairing mode of operation. This is usually performed locally. Pairing mode may be entered into by a manual key sequence or by holding a hidden button for a few seconds.

"Primary Device" in this context refers to first device that pairs with the root trust device after entering an initial configuration state. The Primary device's unique device identifier is permanently imprinted into the root trust device's memory as part of a primary device pairing event. The root trust device transfers a primary device certificate to the primary device which includes logic for transmitting details of the primary device certificate to another root trust device that has entered the initial configuration state as long as a matching unique environmental signal is detected.

"Primary Device Certificate" in this context refers to a digital certificate containing at least one asymmetric key for a primary device generated by the root trust device. In addition to the public key infrastructure functionality, the primary device certificate allows the primary device to reestablish an existing network of trust if the root trust device is inaccessible or rendered inoperable. Elements of the primary device certificate relating to the primary device pairing event (unique environmental signal present during the initial pairing event, and unique device identifier of primary device) are transmitted to a new root trust triggering a recovery protocol that verifies the elements prior to establishing a primary device status for the device with the new root trust device.

"Primary Device Pairing Event" in this context refers to imprinted data in memory of a root trust device containing details related to the first device to pair with the root trust device while in the initial configuration state. The primary device pairing event imprints the unique environmental signal present during the pairing event, the unique device identifier of the device, and the asymmetric key pair generated for the device. The details of the primary device pairing event are partially shared with the device as a primary device certificate. In addition, the details of the primary device pairing event are used as a means of "Proximally Positioned" in this context refers to relative distance between two devices that falls within the range of a short range communications technology, such as, but not limited to, Bluetooth, and Near Field Communications (NFC) technologies.

"Root Trust Device" in this context refers to localized security conferring device that negotiates a trust relationship between proximally positioned devices using a public key infrastructure. The root trust device utilizes a processor/microprocessor, memory, at least one communications module, and a battery. The root trust device protects the exchange of content between localized devices by distributing location dependent certificates.

"Unique Device Identifier (UDI)" in this context refers to hardware or software identifier intrinsically linked to an individual user device. The unique device identifier is transmittable and/or detectable through a short range communication technology with another device.

"Unique Environmental Signal (UES)" in this context refers to detectable location specific signal with unique characteristics that distinguish a location. It should be noted that the UES can be derived from a single signal or a combination signals free available to those in the immediate vicinity. The UES can be accomplished by various existing signals that include but are not limited to, SSID of a wireless access point, wireless access point finger print, or GPS signal retrieved from a paired device, as well as combinations thereof.

Description

Embodiments of a system are disclosed that incorporate personal interactions as a parameter for establishing a web of trust between devices. The system confers security trust and privileges between proximally positioned devices through a root trust device. The root trust device pairs with nearby devices during face to face interactions and establishes trust between the devices by distributing a digital certificate. The digital certificate enables the devices to securely exchange content with the safeguards and benefits of the existing public key infrastructure.

In some embodiments, a method of conferring security trust and privileges between proximally positioned devices in the presence of a root trust device controls a microprocessor to retrieve a unique device identifier (UDI), from at least one other proximally positioned device, and a unique environmental signal (UES) through at least one wireless communications module. The UES and UDI retrieval occurs upon detecting a pairing notification from the at least one other proximally positioned device. The root trust devices generates an asymmetric key pair for the at least one other proximally positioned device paired. The asymmetric key pair, the UDI, and the UES are stored in a paired device memory allocation as a device pairing event through operation of the microprocessor controlled by the device pairing logic. The microprocessor is controlled by a subroutine of the certificate authority management logic to transform the asymmetric key pair into a certificate and then release said certificate through a gateswitch to the at least one other proximally positioned device. Operating an encryptor to encrypt device content on a proximally positioned device by multiplexing a device content signal with an asymmetric key of the certificate. Operating a decryptor to decrypt the device content on the proximally positioned device by multiplexing an encrypted device content signal with a corresponding asymmetric key from a device specific certificate. Operating a decryptor of the second proximally positioned device to decrypt the device content of a first proximally positioned device by multiplexing the encrypted device content signal with the corresponding asymmetric key of a shared certificate.

In some embodiments, the microprocessor is controlled by device pairing logic stored within the root trust device's memory.

In some embodiments, operations of the encryptor are configured, at least in part, by user set policies.

In some embodiments, operation of the decryptor is controlled, at least in part, by the proximal presence of the root trust device to the proximally positioned device.

In some embodiments, operation of the decryptor is controlled, at least in part, by the proximal presence of the root trust device to the first proximally positioned device and the second proximally positioned device.

In some embodiments, the method may include configuring the microprocessor with initial configuration logic stored within the memory. Activating the initial configuration state of the root trust device, upon detecting a threshold charge capacity through a current sensor during the initial charging of the root trust device's battery. Subsequently, activating the at least one wireless communications module to receive the UES and the UDI of the proximally positioned device. Generating a primary device asymmetric key pair for the proximally positioned device to first pair with the root trust device during the initial configuration state. Controlling the microprocessor with the initial configuration logic to imprint the primary device asymmetric key pair, the UDI, and the UES as a primary device pairing event in the paired device memory allocation. Controlling the microprocessor with the initial configuration logic to Transforms the primary device pairing event into a primary device certificate and releasing the primary device certificate to the proximally positioned device by way of the gateswitch. Controlling the microprocessor to activate a recovery protocol in the memory on a new root trust device during the initial configuration state upon receiving a recovery notification signal. Controlling the microprocessor with the recovery protocol to imprint the primary device certificate into the paired device memory allocation of the new root trust device upon matching the UES of the primary device certificate and the UES retrieved through the at least one wireless communications module.

In some embodiments, the microprocessor transforms the primary device pairing event and releases the primary device certificate, generates the primary device asymmetric key pair and imprints the primary device pairing event, under control of an initial configuration logic stored in memory.

In some embodiments, the microprocessor is controlled by the device pairing logic, stored in the memory, to generate the asymmetric key pair and the store the device pairing event.

In some embodiments, the microprocessor transforms and releases the certificate under control of a certificate authority management logic stored in the memory.

In some embodiments, the microprocessor is configured to activate a recovery protocol stored in the memory on a new root trust device during the initial configuration state upon receiving a recovery notification signal. The recovery protocol controls the microprocessor to imprint the primary device certificate into the paired device memory allocation of the new root trust device upon matching the UES of the primary device certificate and the UES retrieved through the at least one wireless communications module.

In some embodiments, the microprocessor is configured with an initial configuration logic stored in the memory.

In some embodiments, the controlling the microprocessor to activate a recovery protocol in the memory on a new root trust device during the initial configuration state upon receiving a recovery notification signal may include the primary device certificate from the proximally positioned device.

In some embodiments, the at least one wireless communications module may include a short range communications module, where the short range communications module requires a device to be positioned proximally to the root trust device to transmit the UDI to the root trust device, encrypted device content between the proximally positioned devices, and the shared certificates from the root trust device to the proximally positioned devices.

In some embodiments, the method may include transmitting the pairing notification to the root trust device from the proximally positioned device through operations of a device processor controlled by a pairing control signal derived from a coded image on the root trust device.

In some embodiments, the at least one wireless communications module detects the UES as a temporal/geolocation signal from a Wi-Fi based positioning system (WiPS).

In some embodiments, the at least one other proximally positioned device is a third party security trust device that shares its existing certificate library with the root trust device in order to confer existing certificates to another proximally positioned device.

Described herein are embodiments of a system to provide a device independent root or basis of trust (root trust device) for mobile device users, enabling them to lock down their mobile experiences securely from intrusion/theft/fraud. From this root of trust, a web of trust may be built, maintained, and rebuilt if necessary. The system comprises an inter-device communication bridge comprising a battery pack, machine memory, certificate authority logic configured to generate public-private key-pairs, WIFI, NFC, Bluetooth, a USB connector, and an Ethernet connector. The battery may include power management logic, and the memory may be utilized (in additional to supporting the RTD function) as a simple USB "stick" as well as for storing voice recordings captured for later sharing. The RTD may report contents of the memory files by type and name. Any file transferred onto the RTD becomes available for secure sharing with other trusted devices.

In some embodiments, an RTD device is charged up (the batteries are charged to a preconfigured level) for a first time after being placed into a commercial operating mode (excluding, for example, charge-ups at the factory for testing purposes). The next pairing event with a separate device (called the 'primary device) will "imprint" the RTD device with the primary device, forming a trust-pair of devices. To ensure trust and reduce the likelihood of impersonation, the RTD and primary device will typically pair up using NFC physical touch, or mutual passphrase authentication. The primary device is configured with logic (e.g., an app) that records a unique environmental signal present at the time of the pairing with the RTD (this is used in the event of a lost/stolen RTD). An example of an environmental signal that might be recorded in association with the pairing event is one or more WiFi access point (WAP) identifiers (a WiFi "fingerprint").

In some embodiments, When the RTD is first paired with the primary device, it initializes by establishing a set of security credentials, comprising a public-private key-pair, and communicates a digital certificate to the primary device. Note that the terms "primary" and "secondary" do not impart any particular distinction in terms of the trust level established. The primary device (present at imprinting of the RTD) may be afforded a same level of trust as devices subsequently paired with the RTD.

In some embodiments, Imprinting the RTD with a primary device may be achieved in a number of ways. For example, the RTD may broadcast a Bluetooth pairing request, and the first device to accept the request may be assigned by the RTD as the primary device (possibly with authentication required to assure physical possession of the RTD by the person accepting the request). In some embodiments, a secondary device must also be present in addition to the primary device, and must be detectable by the RTD, to effect imprinting. NFC or passphrase authentication may be required by the primary (or primary and secondary) devices to consummate imprinting.

In some embodiments, Any subsequent device may be made trusted by the RTD by NFC authentication or mutual passphrase authentication. The presence of an already linked device is detected by the RTD and trust established by NFC or by entering onto the existing and new device the same passphrase. At each pairing of a device to the RTD, a local WIFI WAP fingerprint may be detected and matched and stored as evidence of the pairing event.

In some embodiments, In order to access data on the primary device or any other trusted device, or to share data privately with other devices using the RTD credentials, the RTD device must be physically proximate with a trusted device (e.g., within NFC range). The device will then present, to a user of the device via a machine user interface, a privacy setting option upon sharing of content with other devices. A simple yes/no response is provided (for example) for a non-public (private) sharing event. This marked data will then also be encrypted on the device using keys of the RTD. If the device is ever lost or stolen separately from the RTD, the private data thereon will be inaccessible to intrusion.

In some embodiment, a lost or stolen RTD may be replaced by charging up a new RTD for the first time, and then 'reverse imprinting' the new RTD by having more than 50% of a person's trusted devices (devices previously paired with a lost or stolen RTD, for example) proximate with the new RTD. Cached logic from the previous RTD, present on each device, will then successfully perform the reverse imprint of the new RTD. In an example scenario, a RTD is lost, and the user has for example three devices that have been synced (previously paired) with the lost RTD. The user buys and charges to a preset level a new RTD and wants to reverse imprint it, by having the two or more of his/her devices vote to approve the new RTD as their root of trust.

In some embodiments, In effect the new RTD communicates to the voting devices independently of each other that it has determined that the devices are trusted to have been imprinted with the missing RTD (because their keys match, and possibly the environment fingerprint recorded at imprinting also matches). Once the two devices receive this indication from the RTD, the "reverse imprint" is effected either by NFC/touch or a matching passphrase input to each of the devices.

In some embodiments, the reverse imprint process becomes available only if the new RTD (being charged up for the first time) detects, upon the first imprint event, that there are one or more devices communicating information about a past imprint event to the new RTD, and thus requesting to impose upon the new RTD the identity of a different RTD.

In some embodiments, The new RTD is charged and eventually broadcasts a pairing signal (Bluetooth, WiFi). The RTD communicates with the two devices independently of each other and then notifies them that it has read their prior RTD identity information (about the lost RTD) and that they are in agreement, including any network fingerprint associated with the pairing of the device and lost RTD. The reverse imprint is then accepted via NFC or other authenticated/trusted action. Other devices trusted by the lost RTD are not affected and not a part of the new web of trust.

In some embodiments, If either a trusted device or RTD is stolen in isolation, the data thereon remains safe from intrusion. If a trusted device of the RTD owner has not communicated with the RTD for more than some set period of time (e.g., 24 hours), the private data on that device becomes inaccessible and may only be accessed again once the device is brought back within NFC distance of the RTD. Other devices trusted by lost rtd are still trusted post reverse imprint as established relations are still intact.

In some embodiments, third parties who trust the user of a trusted device may pair their device (third party device) with the trusted device, in the presence of the RTD, thus establishing a chain of trust (involving a transfer of the public key) from the RTD to the RTD through a trusted device of the user, to the third party device. Trust in the user of the RTD may then propagate from the third party device to other devices using know techniques such as GPG key signing. Trust between a third party device and the owner of the RTD may be revoked in manners similar to those used by public key infrastructure/enabled (PKI/PKE) systems.

In some embodiments, content sharing from trusted device to trusted device takes place utilizing a WIFI hotspot provided by the RTD, with encryption, where trust between devices is initiated by mutual smayning of QR codes when two users are in the same location. In some embodiments the trust relationship is session based, not persistent, so that a session is established (e.g., by mutual smay of QR codes) resulting in a mutual exchange of public keys. The session remains active while the parties are in proximity (e.g., Bluetooth range, sharing the same WiFi WAP, or devices touching one another) or for a single "transaction". A transaction may have an extent of the transfer of a single file, one file folder, or some other defined file system or information package unit.

In some embodiments, the level of trust desired may dictate the proximity of the devices when adding a third party device to the web of trust. The proximity measure may be made configurable upon pairing a device. One device may need higher degree of security, i.e. a sharing from said device must be verified by NFC touch—and another such as home computer is acceptable to pair with just WIFI. A tablet might acceptably pair over Bluetooth range.

In some embodiments of the invention the unique device identifier (UDI) is accomplished using an existing device identifiers that include, but are not limited to, Integrated Circuit Card Identifier (ICCID), International Mobile Subscriber Identity (IMSI), International Mobile Station Equipment Identity (IMEI), Mobile Equipment Identifier (MEID), and Electronic Serial Number (ESN). It should be noted that hardware or software identifiers could potentially be implemented.

In some embodiments, The root trust device functions as an external battery charger comprising at least one communications and charging port. The communications and charging port may be accomplished by existing technology such as a Universal Serial Bus port or similar. In some embodiments the communications and charging port is used as the charge source could be determined as being User set polices dictate the device content to be encrypted and how the device content is to be encrypted by the encryptor. In some embodiments, the user set policies are generated through a user interface on the proximally positioned device. The user interface may be particular to interaction with the root trust device or may be provided as an extension of the proximally positioned device's file navigation means. The user set parameters may dictate particular regions of the device memory to be encoded as well particular content. In some embodiments, the user may encrypt a partition of the device memory as an encrypted container and then store the device content they want to protect. In another embodiment the user may dictate certain file extensions or file directory locations to be encrypted. Still in another embodiment, the user may dictate the additional conditions related to the use and exchange of the encrypted device content.

The gateswitch routes generated certificates to the corresponding proximally positioned devices. The gateswitch releases the certificates through the wireless communications module to the proximally positioned devices under control of the certificate authority logic. In some embodiments the certificate authority logic ensures that the certificates are released appropriately to the proximally positioned devices. In some embodiments the gateswitch is an extension of a gateway that controls the ingress and egress of information through the root trust device.

In some embodiments, the at least one wireless communications module comprises a short range communications module. In some embodiments the short range communications module may be accomplished by a near field communication (NFC) module.

In some embodiments, the root trust device may be emulated on a proximally positioned device. In the aforementioned embodiment, the emulated root trust device would utilize the processing or memory components of the proximally positioned device performs its operations, wherein the logic of the emulated root trust device would be stored on the proximally positioned devices memory. Alternatively, the logic of the root trust device may be stored remotely while operating components of the proximally positioned device.

Drawings

FIG. 1 illustrates an embodiment of the proximity based security certificate management system 100. The proximity based security certificate management system 100 comprises a power source 108, a wireless access point 106, a root trust device 104, and a proximal location to root trust device 124. The proximal location to root trust device 124 comprises a primary device 118, a first proximally positioned device 110, and a second proximally positioned device 112. The power source 108 is an external power source that charges and internal battery of the root trust device 104 enabling it to function as a external battery supply. The wireless access point 106 that communicates a unique environmental signal 116 to the root trust device 104 during a pairing event after receiving a pairing notification 114. During an initial configuration state the primary device 118 transmits its unique device identifier 122 to be imprinted in a paired device memory allocation along with the unique environmental signal 116. Following pairing events, the root trust device 104 generates certificates for the proximally positioned devices. The root trust device 104 generates shared certificate 102 to be distributed to the a first proximally positioned device 110 and a second proximally positioned device 112 allowing them to share and decrypt encrypted device content 120 in the proximal presence of the root trust device 104. The proximity based security certificate management system 100 may be operated in accordance with the process described in FIG. 2, FIG. 4, FIG. 6, FIG. 8, FIG. 10, FIG. 12, and FIG. 14.

Figure 2:
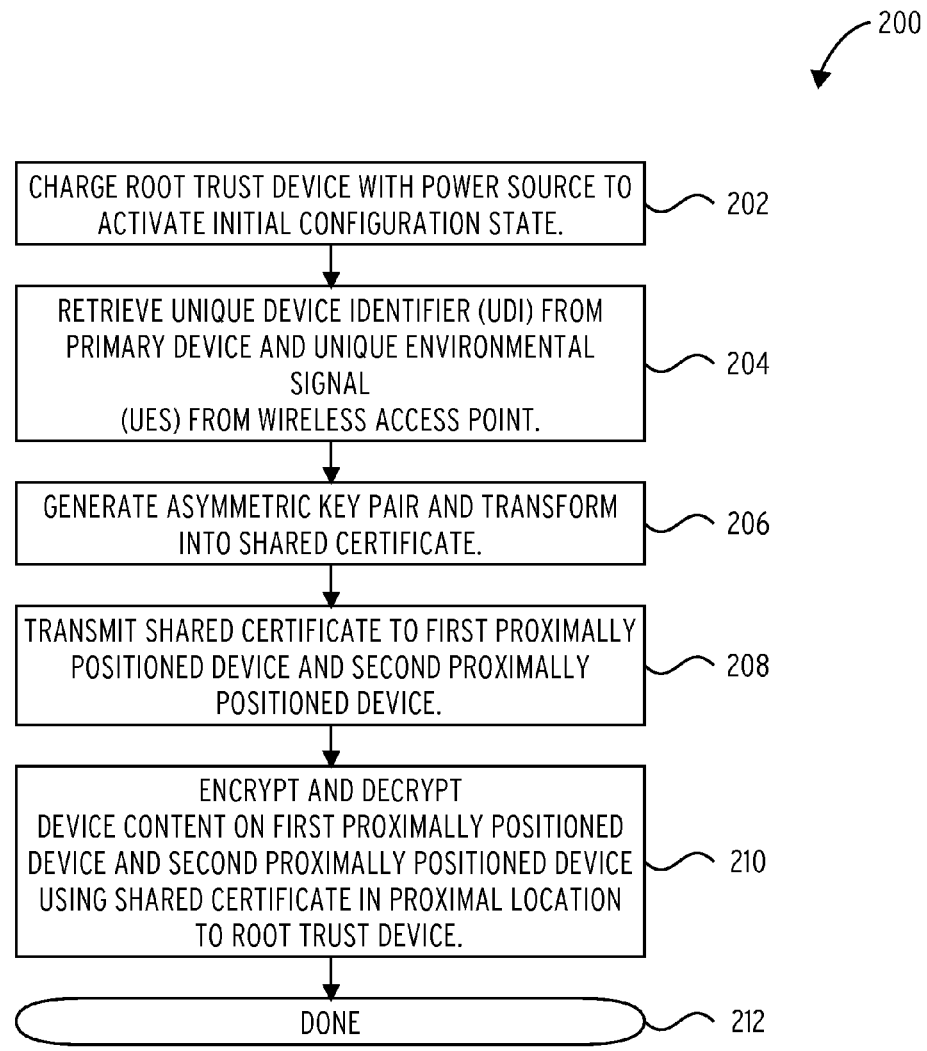
FIG. 2 illustrates an embodiment of a proximity based security process 200.

FIG. 2 illustrates an embodiment of the proximity based security process 200.

In block 202, proximity based security process 200 Charges a root trust device with a power source to activate an initial configuration state.

In block 204, proximity based security process 200 Retrieves a unique device identifier (UDI) from a primary device and a unique environmental signal (UES) from a wireless access point.

In block 206, proximity based security process 200 Generates an asymmetric key pair and transforms them into a shared certificate.

In block 208, proximity based security process 200 Transmits the shared certificate to a first proximally positioned device and a second proximally positioned device.

In block 210, proximity based security process 200 Encrypts and decrypts the device content on the first proximally positioned device and the second proximally positioned device using the shared certificate in proximal location to the root trust device.

In done block 212, proximity based security process 200 is done.

Figure 3:
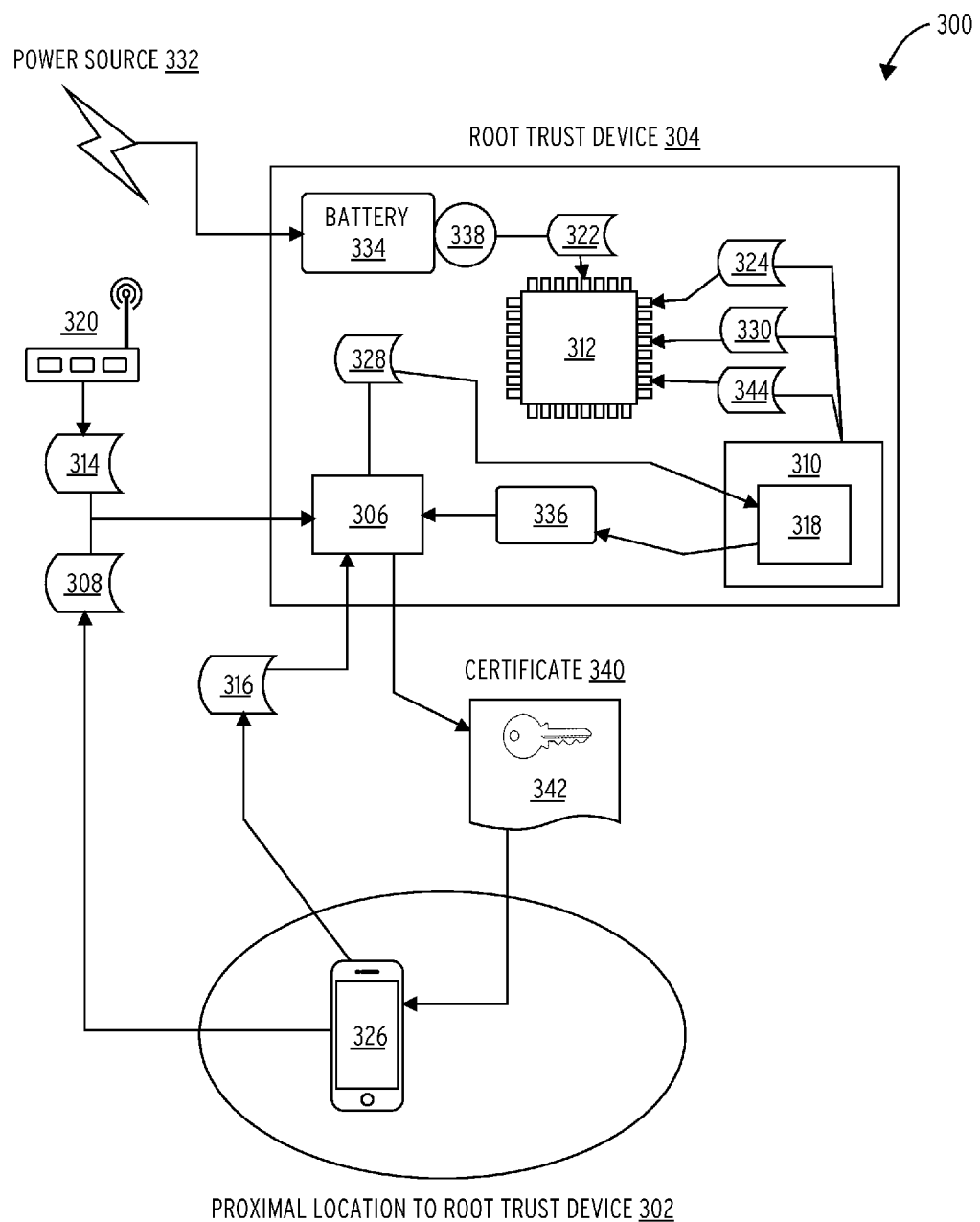
FIG. 3 illustrates an embodiment of an proximity based security certificate management system 300.

FIG. 3 illustrates and embodiment the proximity based security certificate management system 300. The proximity based security certificate management system 300 comprises a power source 332, a root trust device 304, a Wireless access point 320, and a proximal location to root trust device 302. The root trust device 304 comprises a battery 334, a current sensor 338, a microprocessor 312, a memory 310, at least one wireless communications module 306, and a gateswitch 336. The proximal location to root trust device 302 comprises a primary device 326. The memory 310 comprises an initial configuration logic 324, a device pairing logic 330, and a certificate authority management logic 344. The memory 310 additionally comprises a paired device memory allocation 318. The primary device 326 comprises a unique device identifier 308. The primary device 326 generates a pairing event notification 316 and transmits to the root trust device 304. The Wireless access point 320 comprises a unique environmental signal 314 and transmits to the root trust device 304. The paired device memory allocation 318 receives and stores the unique environmental signal 314, the unique device identifier 308, and an asymmetric key pair as the primary device pairing event 328. The microprocessor 312 detects a threshold charge capacity 322 from the current sensor 338. The proximity based security certificate management system 300 may be operated in accordance with the process described in FIG. 4.

Figure 4:
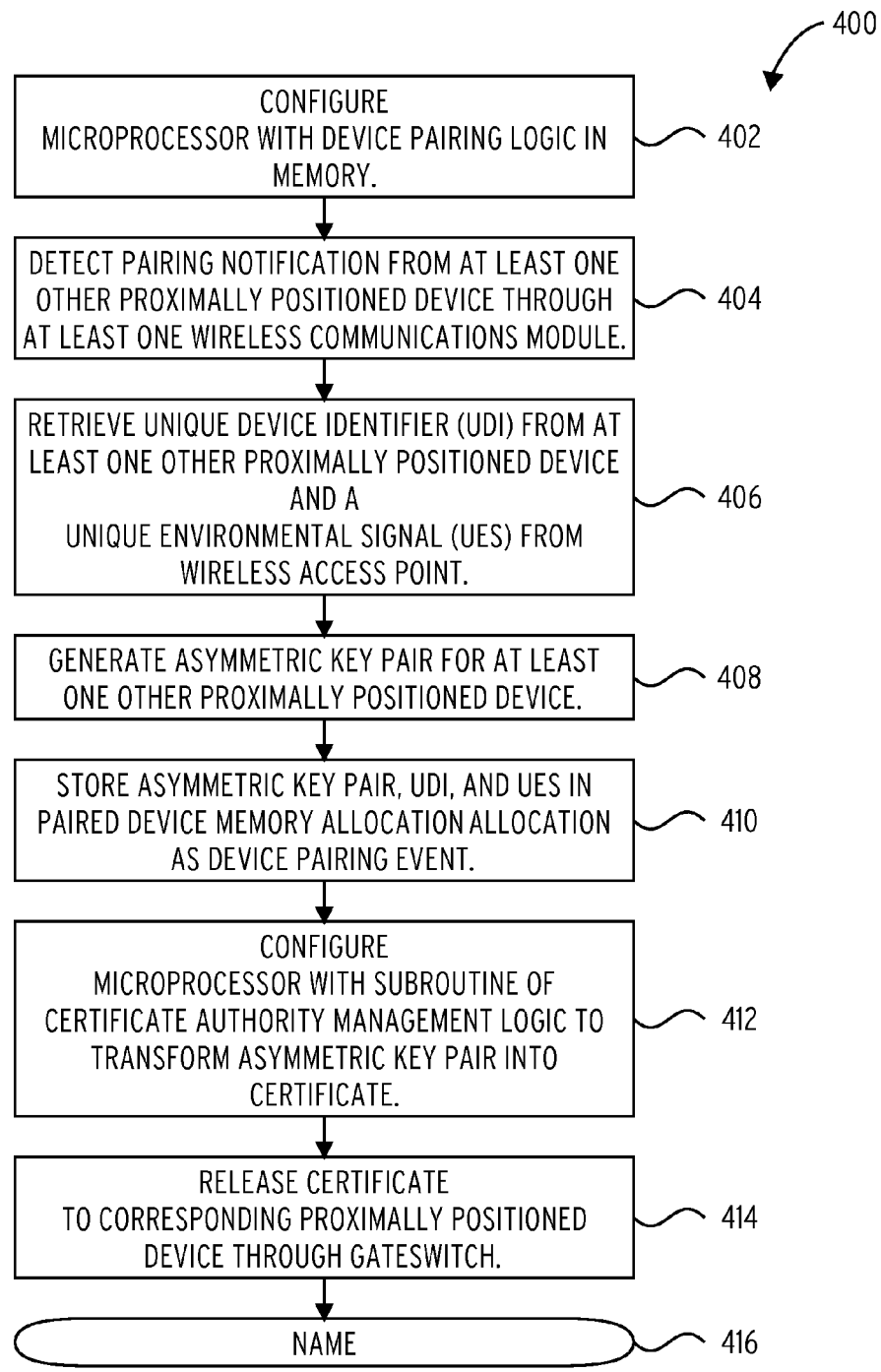
FIG. 4 illustrates an embodiment of a proximity based security process 400.

FIG. 4 illustrate an embodiment of the proximity based security process 400.

In block 402, proximity based security process 400 Configures a microprocessor with device pairing logic stored in memory.

In block 404, proximity based security process 400 Detects pairing notification from at least one other proximally positioned device through at least one wireless communications module.

In block 406, proximity based security process 400 Retrieves a unique device identifier (UDI) from the at least one other proximally positioned device and a unique environmental signal (UES) from a wireless access point.

In block 408, proximity based security process 400 Generates an asymmetric key pair for the at least one other proximally positioned device.

In block 410, proximity based security process 400 Stores the asymmetric key pair, the UDI, and the UES in paired device memory allocation as a device pairing event.

In block 412, proximity based security process 400 Configures the microprocessor with a subroutine of a certificate authority management logic to transform the asymmetric key pair into a certificate.

In block 414, proximity based security process 400 Releases the certificate to a corresponding proximally positioned device through a gateswitch.

In done block 416, proximity based security process 400 is done.

Figure 5:
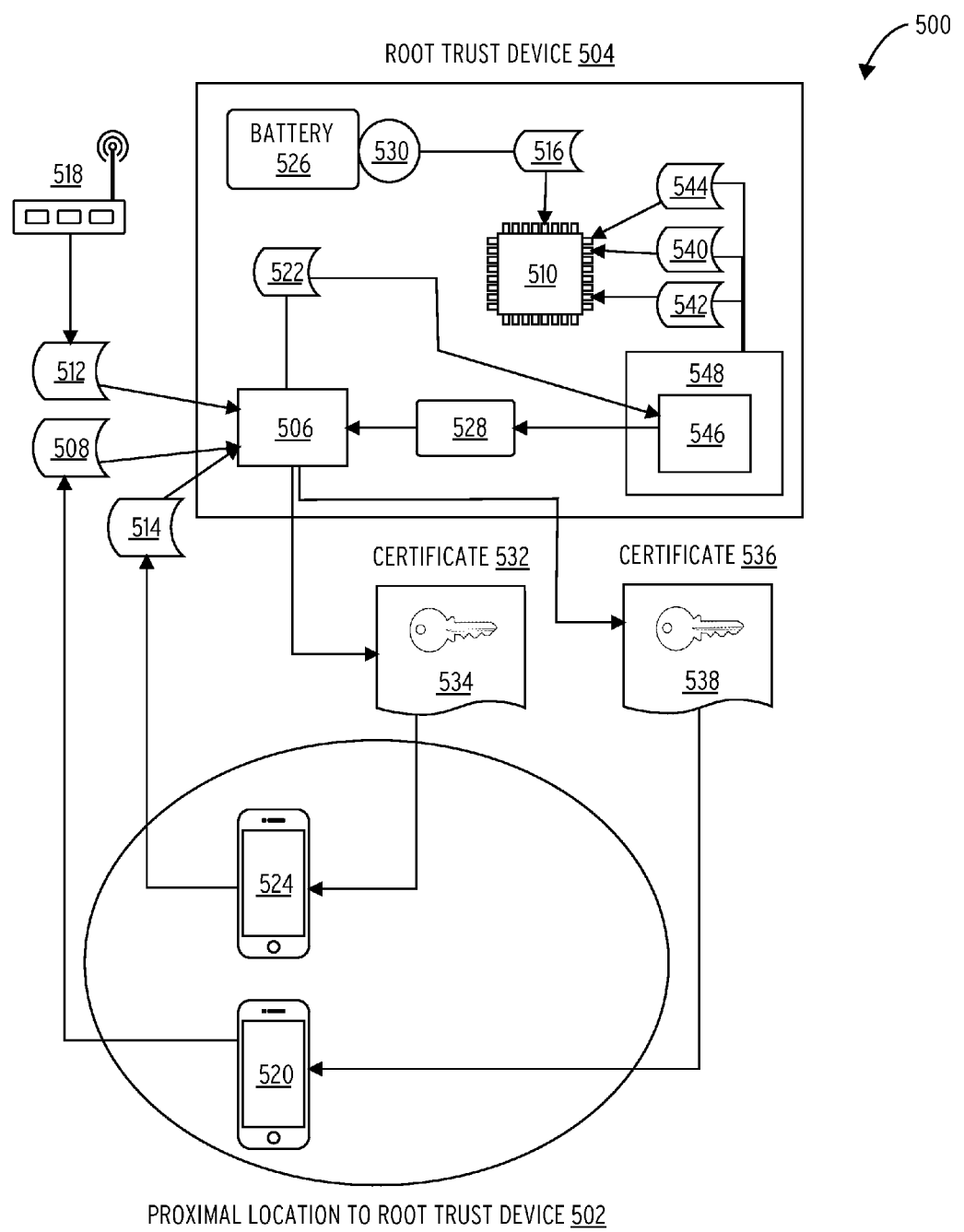
FIG. 5 illustrates an embodiment of a proximity based security certificate management system 500.

FIG. 5 illustrates and embodiment of the proximity based security certificate management system 500. The proximity based security certificate management system 500 comprises a Wireless access point 518, a root trust device 504, and a proximal location to root trust device 502 comprising a first proximally positioned device 524 and second proximally positioned device 520. The first proximally positioned device 524 comprises a unique device identifier 514. The second proximally positioned device 520 comprises a unique device identifier 508. The Wireless access point 518 comprises a unique environmental signal 512. The root trust device 504 comprises a battery 526, a current sensor 530, a memory 548, a gateswitch 528, and at least one wireless communications module 506. The device pairing event 522 comprises the unique environmental signal 512, the unique device identifier 508, the unique device identifier 514 and an asymmetric key pair. The memory 548 comprises the paired device memory allocation 546. The memory 548 stores initial configuration logic 544, device pairing logic 540, and a certificate authority management logic 542. The paired device memory allocation 546 comprises the device pairing event 522. The microprocessor 510 detects the threshold charge capacity 516 from the current sensor 530. The gateswitch 528 releases the certificate 532 and the certificate 536 through the at least one wireless communications module 506. The certificate 532 comprises the asymmetric key 534, and the certificate 536 comprises the asymmetric key 538. The proximity based security certificate management system 500 may be operated in accordance to the process described in FIG. 6.

Figure 6:
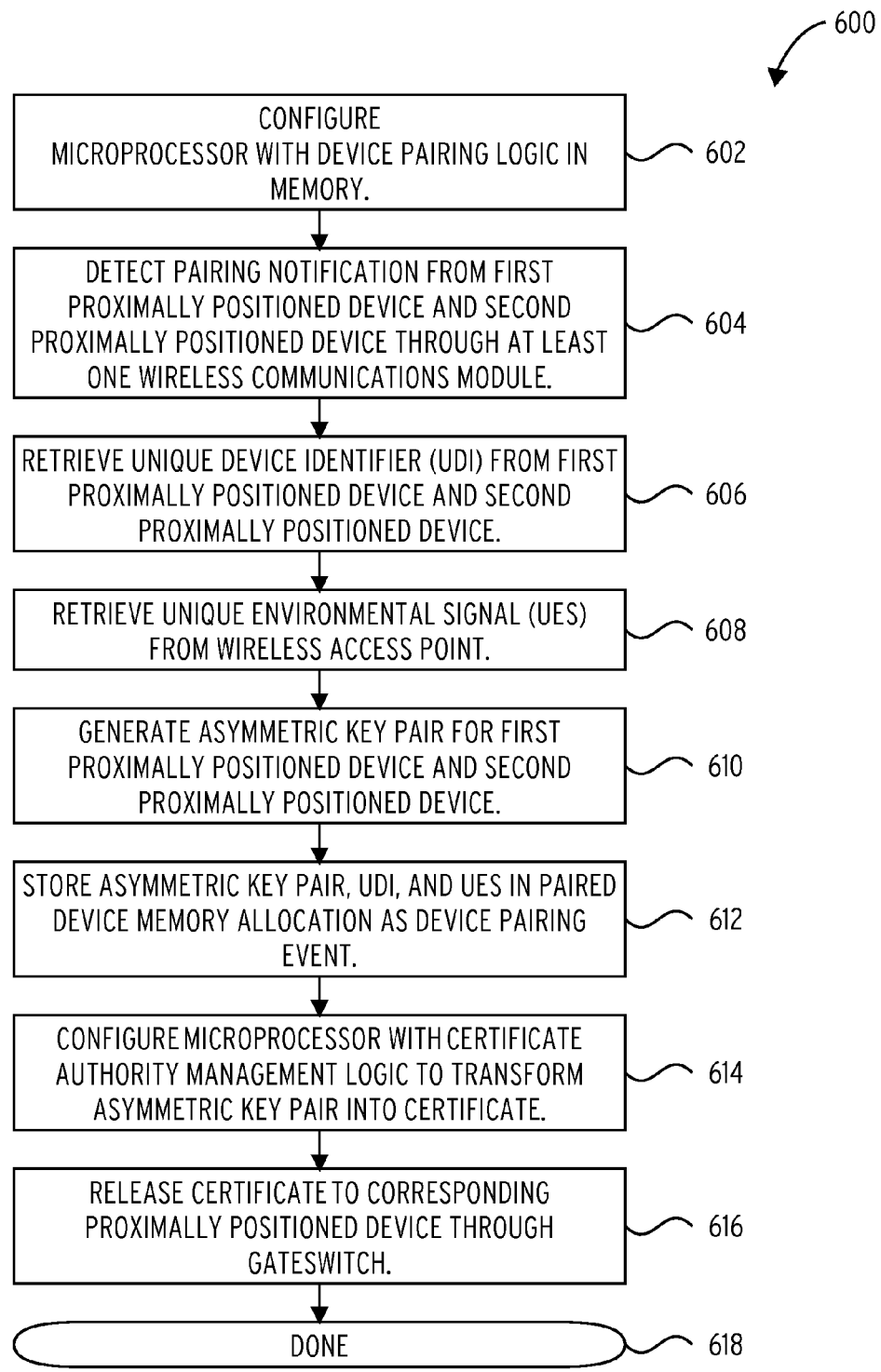
FIG. 6 illustrates an embodiment of a proximity based security process 600.

FIG. 6 illustrate an embodiment of the proximity based security process 600.

In block 602, proximity based security process 600 Configure microprocessor with device pairing logic in memory.

In block 604, proximity based security process 600 Detects a pairing notification from a first proximally positioned device and a second proximally positioned device through at least one wireless communications module.

In block 606, proximity based security process 600 Retrieves a unique device identifier (UDI) from the first proximally positioned device and the second proximally positioned device.

In block 608, proximity based security process 600 Retrieves a unique environmental signal (UES) from a wireless access point.

In block 610, proximity based security process 600 Generates an asymmetric key pair for the first proximally positioned device and the second proximally positioned device.

In block 612, proximity based security process 600 Stores the asymmetric key pair, the UDI, and the UES in a paired device memory allocation as a device pairing event.

In block 614, proximity based security process 600 Configures the microprocessor with a certificate authority management logic to transform the asymmetric key pair into a shared certificate.

In block 616, proximity based security process 600 Releases the shared certificate to the corresponding proximally positioned device through a gateswitch.

In done block 618, proximity based security process 600 is done.

Figure 7:
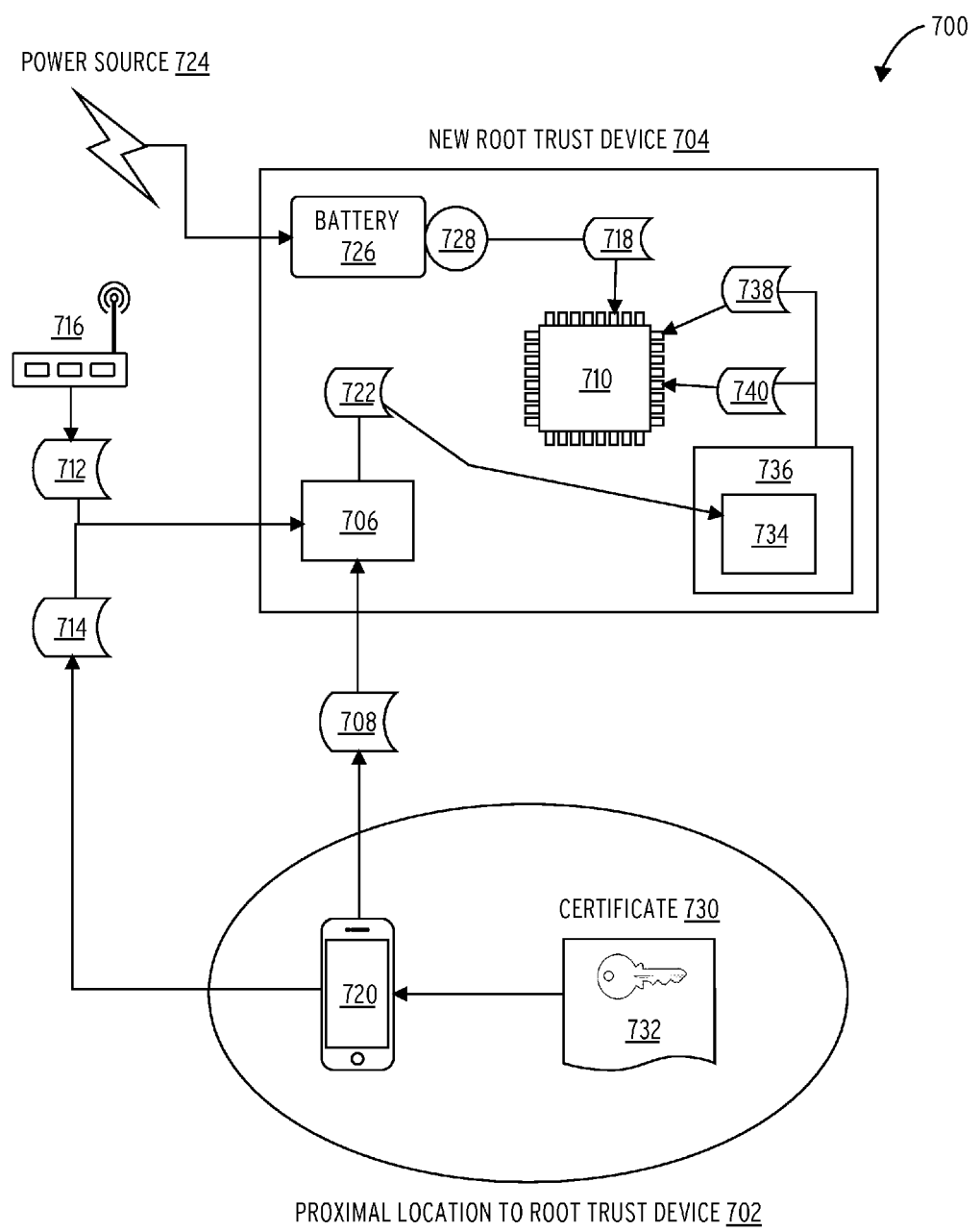
FIG. 7 illustrates an embodiment of an proximity based security certificate management system 700.

FIG. 7 illustrates an embodiment of the proximity based security certificate management system 700. The proximity based security certificate management system 700 comprises a new root trust device 704, a power source 724, a Wireless access point 716, and a proximal location to root trust device 702 comprising a primary device 720. The Wireless access point 716 comprises a unique environmental signal 712. The new root trust device 704 comprises a battery 726, a current sensor 728, a memory 736, a microprocessor 710, and at least one wireless communications module 706. The memory 736 comprises a recovery protocol 738 and a certificate authority management logic 740. The memory 736 comprises a paired device memory allocation 734. The primary device 720 comprises a primary device certificate 730 comprising an asymmetric key 732. The primary device 720 comprises to recovery notification signal 708 and a unique device identifier 714. The paired device memory allocation 734 comprises the primary device pairing event 722 comprising the unique device identifier 714 and the unique environmental signal 712. The proximity based security certificate management system 700 may be operated in accordance to the process described in FIG. 8.

Figure 8:
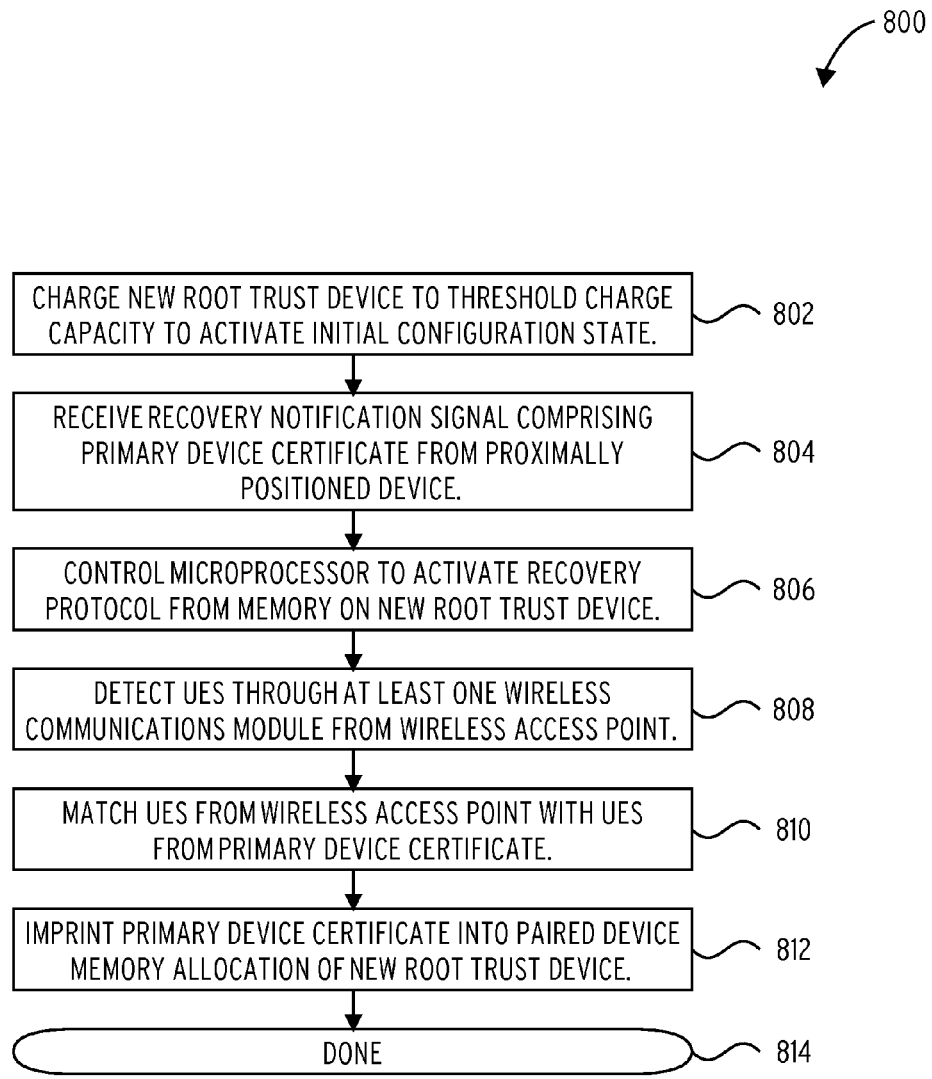
FIG. 8 illustrates an embodiment of a proximity based security process 800

FIG. 8 illustrates an embodiment of the proximity based security process 800.

In block 802, proximity based security process 800 Charges a new root trust device to a threshold charge capacity to activate an initial configuration state.

In block 804, proximity based security process 800 Receives a recovery notification signal comprising a primary device certificate from a proximally positioned device.

In block 806, proximity based security process 800 Controls a microprocessor to activate a recovery protocol from memory on the new root trust device.

In block 808, proximity based security process 800 Detects a UES through at least one wireless communications module from a wireless access point.

In block 810, proximity based security process 800 Matches the UES from wireless access point with the UES from the primary device certificate.

In block 812, proximity based security process 800 Imprints the primary device certificate into the paired device memory allocation of the new root trust device.

In done block 814, proximity based security process 800 is done.

Figure 9:
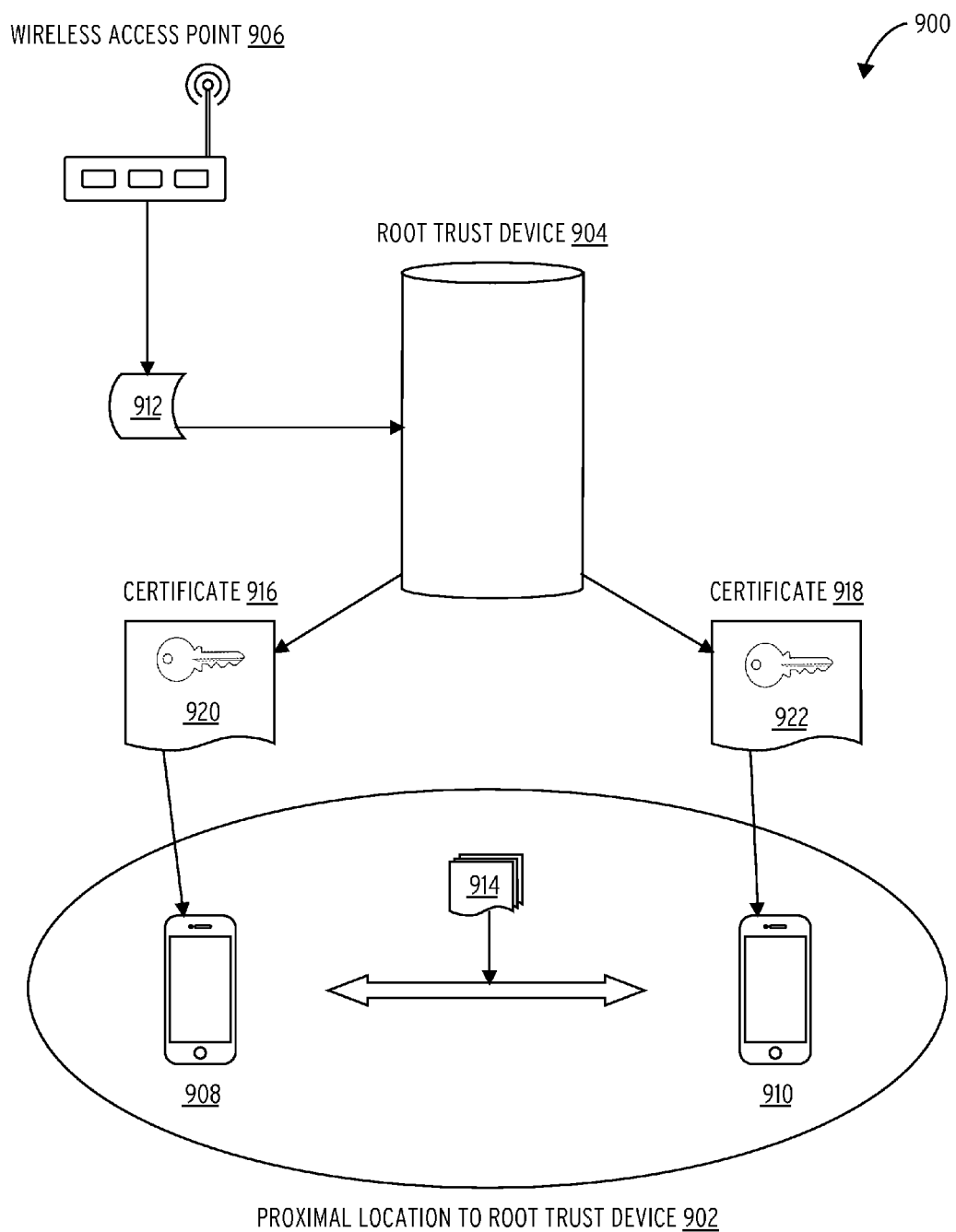
FIG. 9 illustrates an embodiment of a proximity based security certificate management system 900.

FIG. 9 illustrates an embodiment of the proximity based security certificate management system 900. The 900 comprises a root trust device 910, a wireless access point 912, and a proximal location to root trust device 922 comprising a first proximally positioned device 904 and a second proximally positioned device 906. The wireless access point 912 comprises a unique environmental signal 914. The first proximally positioned device 904 comprises a certificate 902 comprising an asymmetric key 916. The second proximally positioned device 906 comprises a certificate 918 comprising an asymmetric key 920. The first proximally positioned device 904 and the second proximally positioned device 906 both comprise encrypted device content 908. The proximity based security certificate management system 700 may be operated in accordance with the process described in the FIG. 10.

Figure 10:
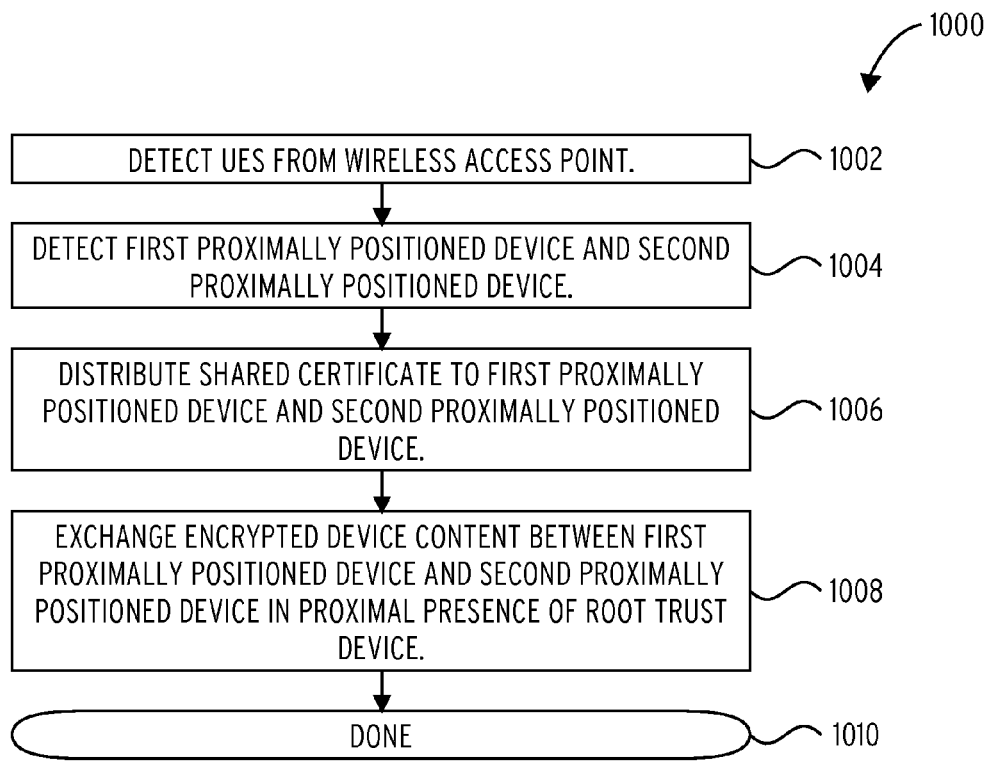
FIG. 10 illustrates an embodiment of a proximity based security process 1000.

FIG. 10 illustrates and embodiment of the proximity based security process 1000.

In block 1002, proximity based security process 1000 Detects a UES from a wireless access point.

In block 1004, proximity based security process 1000 Detects a first proximally positioned device and a second proximally positioned device.

In block 1006, proximity based security process 1000 Distributes a shared certificate to the first proximally positioned device and the second proximally positioned device.

In block 1008, proximity based security process 1000 Exchanges encrypted device content between the first proximally positioned device and the second proximally positioned device in proximal presence of a root trust device.

In done block 1010, proximity based security process 1000 is done.

Figure 11:
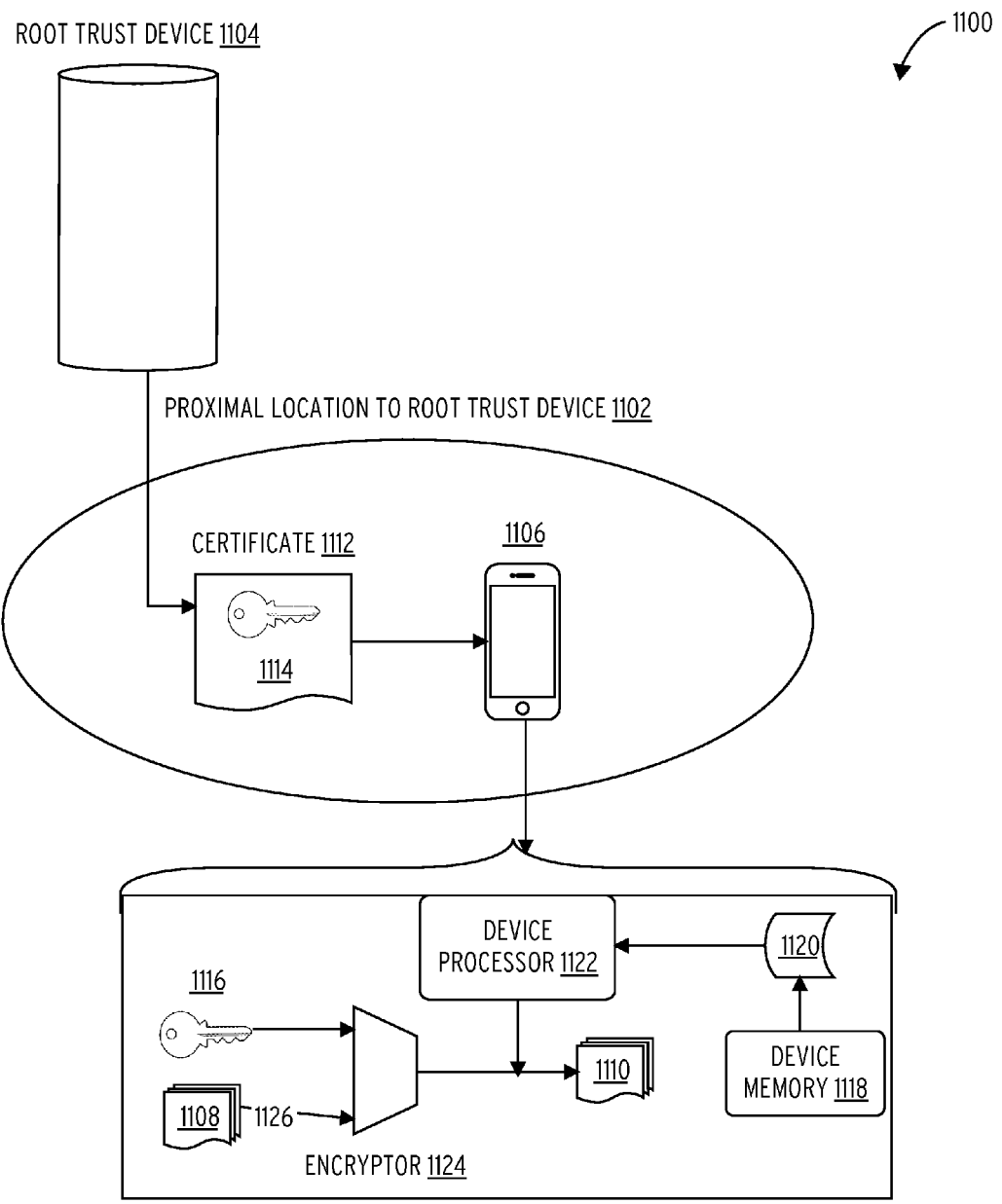
FIG. 11 illustrates an embodiment of an proximity based security certificate management system 1100.

FIG. 11 illustrates an embodiment of the proximity based security certificate management system 1100. The proximity based security certificate management system 1100 comprises a root trust device 1102, and a proximal location to root trust device 1126. The 1126 comprises a proximally positioned device 1104. The proximally positioned device 1104 comprises a certificate 1110 comprising an asymmetric key 1114. The proximally positioned device 1104 further comprises an asymmetric key 1112, device content 1108, a device content signal 1118, an encryptor 1128, an encrypted device content 1116, a device memory 1120, and a device processor 1124. The device memory 1120 comprises user set policies 1122. The proximity based security certificate management system 1100 may be operated in accordance to the process described in FIG. 12.

Figure 12:
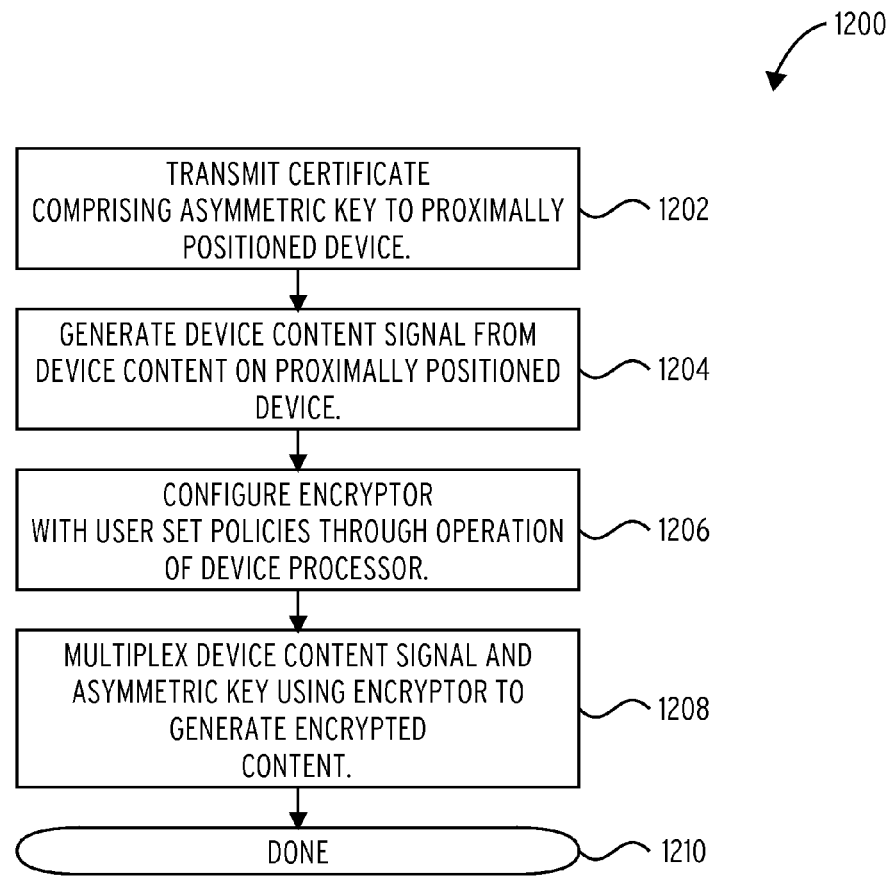
FIG. 12 illustrates an embodiment of a proximity based security process 1200.

FIG. 12 illustrates an embodiment of the proximity based security process 1200.

In block 1202, proximity based security process 1200 Transmits a certificate comprising an asymmetric key to a proximally positioned device.

In block 1204, proximity based security process 1200 Generates a device content signal from device content on the proximally positioned device.

In block 1206, proximity based security process 1200 Configures an encryptor with user set policies through operation of a device processor.

In block 1208, proximity based security process 1200 Multiplexes the device content signal and the asymmetric key using the encryptor to generate encrypted content.

In done block 1210, proximity based security process 1200 is done.

Figure 13:
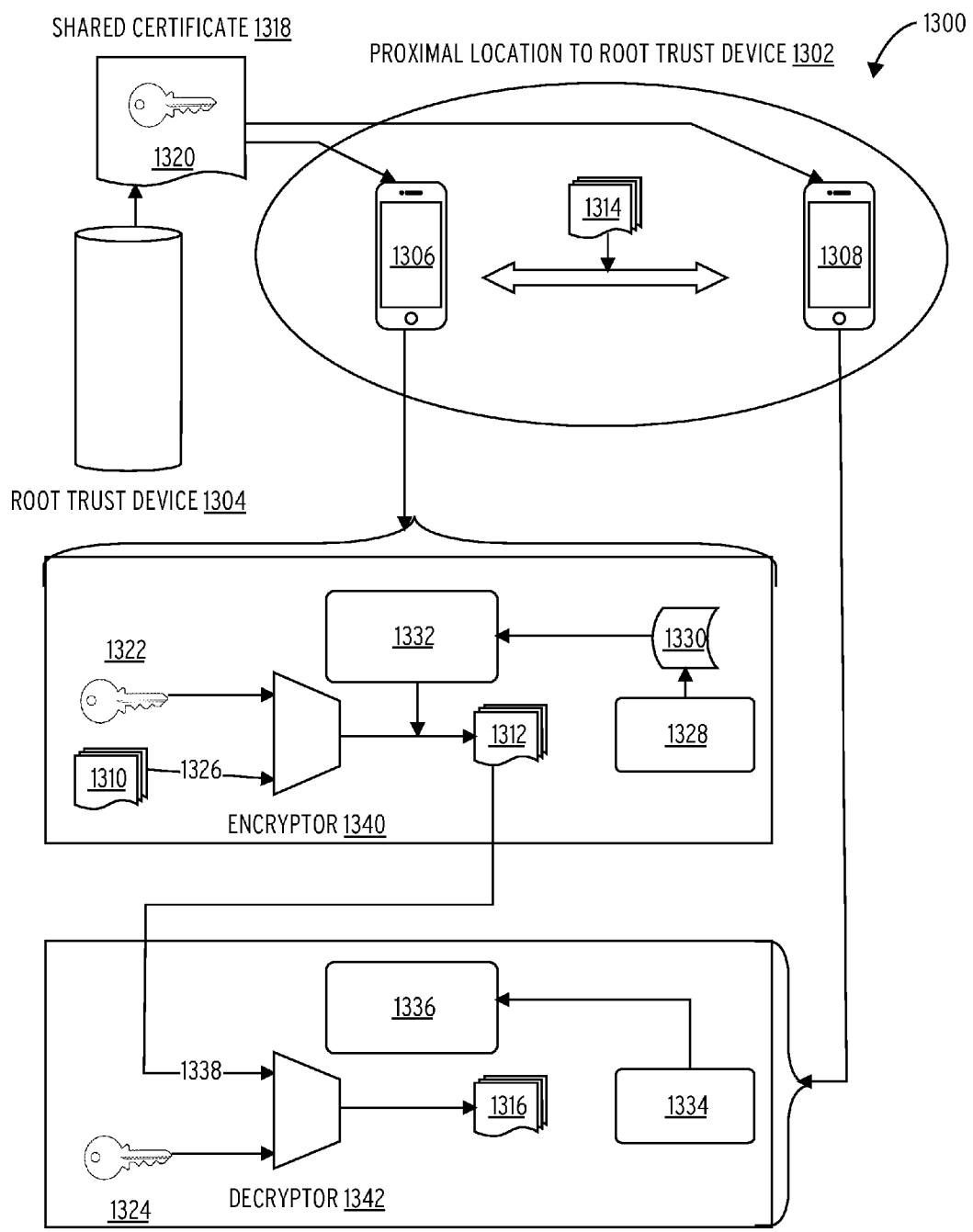
FIG. 13 illustrates an embodiment of a proximity based security certificate management system 1300.

FIG. 13 illustrates an embodiment of the proximity based security certificate management system 1300. The proximity based security certificate management system 1300 comprises a root trust device 1302 and a proximal location to root trust device 1344. The proximal location to root trust device 1344 comprises a first proximally positioned device 1304 and a second proximally positioned device 1326. The first proximally positioned device 1304 and the second proximally positioned device 1326 each comprise a shared certificate 1340 and encrypted device content 1328. The shared certificate 1340 comprises an asymmetric key pair 1342. The first proximally positioned device 1304 comprises an asymmetric key 1314, device content 1306, a device content signal 1318, an encryptor 1326, an encrypted device content 1308, a device processor 1324, and device memory 1320. The device memory 1320 comprises user set policies 1322. The second proximally positioned device 1326 comprises a corresponding asymmetric key 1330, encrypted device content 1308, encrypted device content signal 1334, a decryptor 1328, an encrypted device content 1312, a device memory 1336, and a device processor 1338. The proximity based security certificate management system 1300 may be operated in accordance to the process described in FIG. 14.

Figure 14:
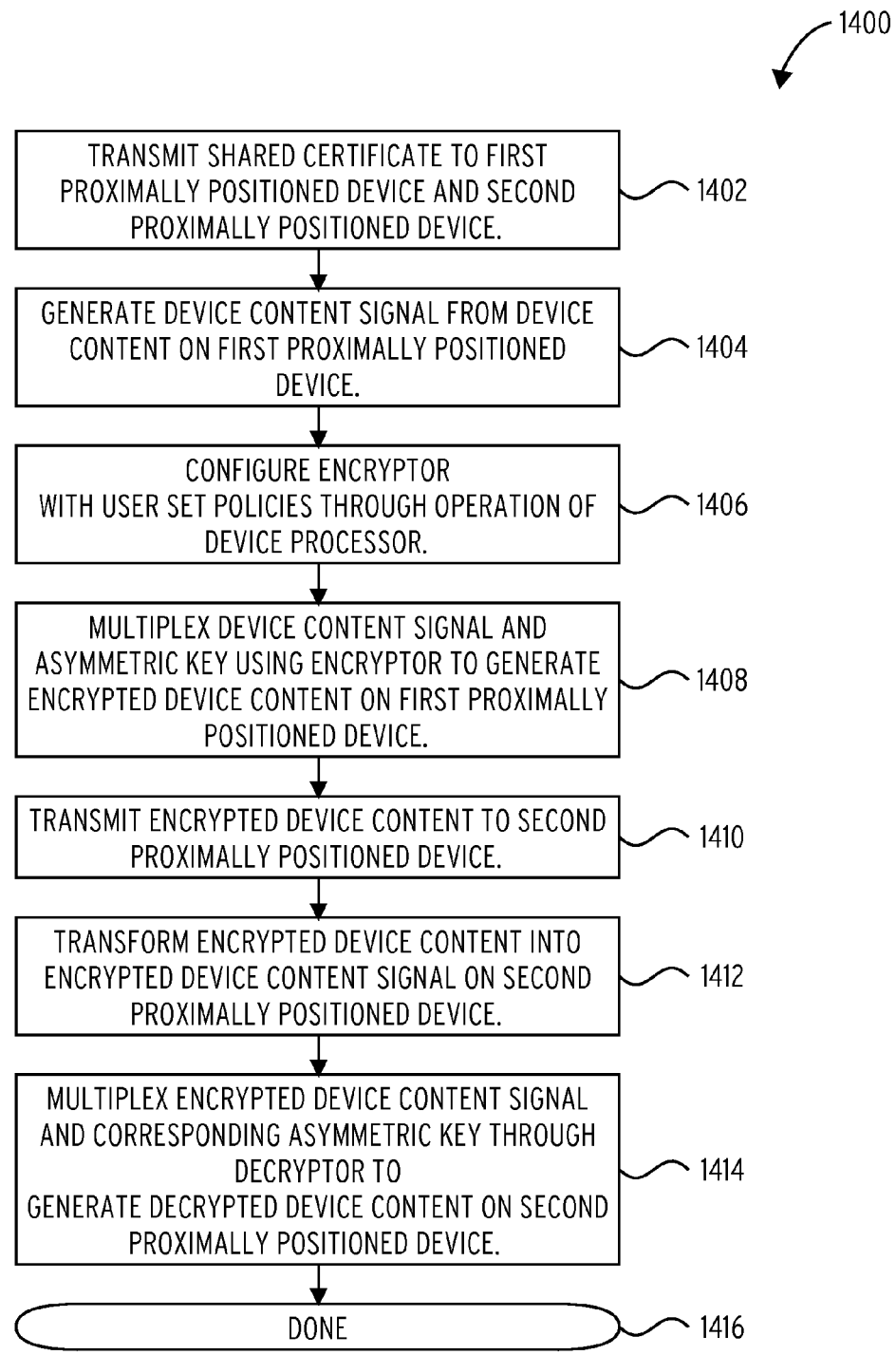
FIG. 14 illustrates an embodiment of a proximity based security process 1400.

FIG. 14 illustrates an embodiment of the proximity based security process 1400.

In 1402, proximity based security process 1400 Transmits a shared certificate to a first proximally positioned device and a second proximally positioned device.

In 1404, proximity based security process 1400 Generates a device content signal from device content on the first proximally positioned device.

In block 1406, proximity based security process 1400 Configures an encryptor with user set policies through operations of the device processor.

In block 1408, proximity based security process 1400 Multiplexes the device content signal and an asymmetric key using the encryptor to generate encrypted device content on the first proximally positioned device.

In block 1410, proximity based security process 1400 Transmits the encrypted device content to the second proximally positioned device.

In block 1412, proximity based security process 1400 Transforms the encrypted device content into an encrypted device content signal on the second proximally positioned device.

In block 1414, proximity based security process 1400 Multiplexes the encrypted device content signal and a corresponding asymmetric key through a decryptor to generate decrypted device content on the second proximally positioned device.

In done block 1416, proximity based security process 1400 is done.

Figure 15:
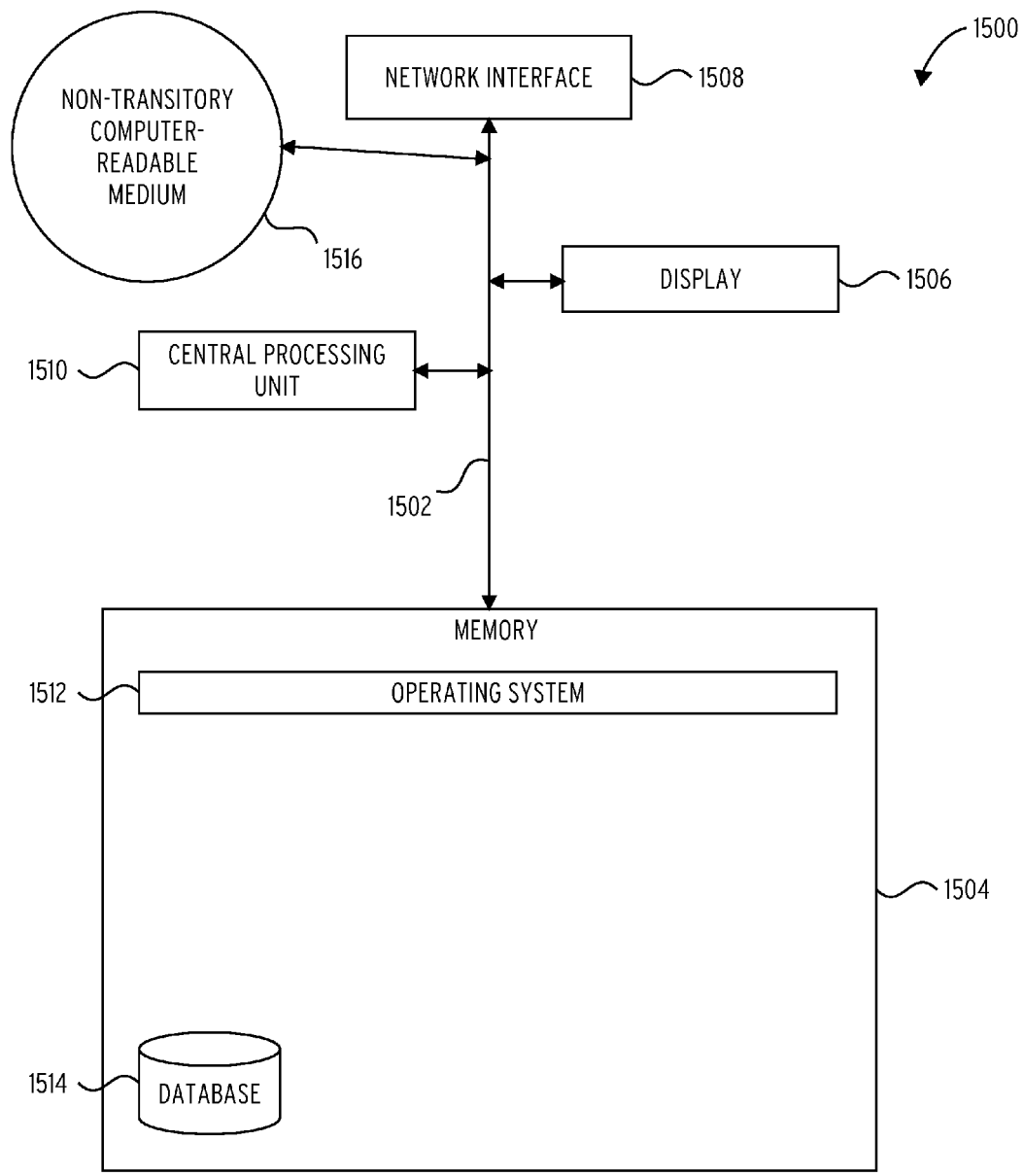
FIG. 15 illustrates a device utilized in a trust chain 1500 in accordance with one embodiment.

FIG. 15 illustrates several components of an exemplary device utilized in a trust chain 1500 in accordance with one embodiment. In various embodiments, device utilized in a trust chain 1500 may include a desktop PC, server, workstation, mobile phone, laptop, tablet, set-top box, appliance, or other computing device that is capable of performing operations such as those described herein. In some embodiments, device utilized in a trust chain 1500 may include many more components than those shown in FIG. 15. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, device utilized in a trust chain 1500 may comprise one or more physical and/or logical devices that collectively provide the functionalities described herein. In some embodiments, device utilized in a trust chain 1500 may comprise one or more replicated and/or distributed physical or logical devices.

In some embodiments, device utilized in a trust chain 1500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Device utilized in a trust chain 1500 includes a bus 1502 interconnecting several components including a network interface 1508, a display 1506, a central processing unit 1510, and a memory 1504.

Memory 1504 generally comprises a random access memory ("RAM") and permanent non-transitory mass storage device, such as a hard disk drive or solid-state drive. Memory 1504 stores an operating system 1512.

These and other software components may be loaded into memory 1504 of device utilized in a trust chain 1500 using a drive mechanism (not shown) associated with a non-transitory computer-readable medium 1516, such as a floppy disc, tape, DVD/CD-ROM drive, memory card, or the like.

Memory 1504 also includes database 1514. In some embodiments, server 200 (deleted) may communicate with database 1514 via network interface 1508, a storage area network ("SAN"), a high-speed serial bus, and/or via the other suitable communication technology.

In some embodiments, database 1514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method of conferring security trust and privileges between proximally positioned devices in the presence of a root trust device comprises:
   configuring a microprocessor to activate at least one wireless communications module, as part of an initial configuration state, to receive a unique environmental signal (UES) and a proximally positioned device's unique device identifier (UDI) in response to detecting, through a current sensor, a threshold charge capacity during a battery's initial charging, wherein the microprocessor is configured with an initial configuration logic stored in memory;
   generating a primary device asymmetric key pair for the proximally positioned device to first pair with the root trust device in the initial configuration state and imprinting the primary device asymmetric key pair, the UDI, and the UES as a primary device pairing event in a paired device memory allocation, wherein the microprocessor generates the primary device asymmetric key pair and imprints the primary device pairing event under control of the initial configuration logic;

transforming the primary device pairing event into a primary device certificate and releasing the primary device certificate through a gateswitch to the proximally positioned device, wherein the microprocessor transforms the primary device pairing event and releases the primary device certificate under control of the initial configuration logic;

controlling the microprocessor to activate a recovery protocol in the memory on a new root trust device during the initial configuration state upon receiving a recovery notification signal comprising the primary device certificate from the proximally positioned device, the new root trust device being a different device than the root trust device;

imprinting the primary device certificate into the paired device memory allocation of the new root trust device upon matching the UES of the primary device certificate and the UES retrieved through the at least one wireless communications module through operations of the microprocessor controlled by the recovery protocol controlling the microprocessor to retrieve the UDI from at least one other proximally positioned device, and the UES through the at least one wireless communications module upon detecting a pairing notification from the at least one other proximally positioned device, wherein the microprocessor is controlled by device pairing logic stored within the memory, the at least one other proximally positioned device being a different device than the proximally positioned device;

generating an asymmetric key pair for the at least one other proximally positioned device paired with the root trust device and storing the asymmetric key pair, the UDI, and the UES as a device pairing event in the paired device memory allocation, wherein the microprocessor is controlled by the device pairing logic, stored in the memory, to generate the asymmetric key pair and the store the device pairing event; and transforming the asymmetric key pair into a certificate and releasing said certificate through the gateswitch to the at least one other proximally positioned device, wherein the microprocessor transforms and releases the certificate under control of a certificate authority management logic stored in the memory.

2. The method of claim 1 comprises:

encrypting device content on the proximally positioned device by multiplexing a device content signal with an asymmetric key of the certificate through operation of an encryptor, wherein operations of the encryptor are configured, at least in part, by user set policies;

decrypting the device content on the proximally positioned device by multiplexing an encrypted device content signal with a corresponding asymmetric key of a device specific certificate through operations of a decryptor, wherein operation of the decryptor is controlled, at least in part, by the proximal presence of the root trust device to the proximally positioned device; and decrypting the device content of a first proximally positioned device on a second proximally positioned device by multiplexing the encrypted device content signal with the corresponding asymmetric key of a shared certificate through operations of the decryptor of the second proximally positioned device, wherein operation of the decryptor is controlled, at least in part, by the proximal presence of the root trust device to the first proximally positioned device and the second proximally positioned device.

3. The method of claim 1, wherein the at least one wireless communications module comprise a short range communications module, where the short range communications module requires a device to be positioned proximally to the root trust device to transmit the UDI to the root trust device, encrypted device content between the proximally positioned devices, and a shared certificates from the root trust device to the proximally positioned devices.

4. The method of claim 1, comprises:

transmitting the pairing notification to the root trust device from the proximally positioned device through operations of a device processor controlled by a pairing control signal derived from a coded image on the root trust device.

5. The method of claim 1, wherein the at least one wireless communications module detects the UES as a temporal/geolocation signal from a Wi-Fi based positioning system (WiPS).

6. The method of claim 1, wherein the at least one other proximally positioned device is a third party security trust device that shares its existing certificate library with the root trust device in order to confer existing certificates to another proximally positioned device.

7. A computer system, comprises:

a processor; and a memory storing instructions that, when executed by the processor, configure the apparatus to:

configure a microprocessor to activate at least one wireless communications module, as part of an initial configuration state, to receive a unique environmental signal (UES) and a proximally positioned device's unique device identifier (UDI) in response to detecting, through a current sensor, a threshold charge capacity during a battery's initial charging, wherein the microprocessor is configured with an initial configuration logic stored in memory;

generate a primary device asymmetric key pair for the proximally positioned device to first pair with the root trust device in the initial configuration state and imprinting the primary device asymmetric key pair, the UDI, and the UES as a primary device pairing event in a paired device memory allocation, wherein the microprocessor generates the primary device asymmetric key pair and imprints the primary device pairing event under control of the initial configuration logic; and transform the primary device pairing event into a primary device certificate and releasing the primary device certificate through a gateswitch to the proximally positioned device, wherein the microprocessor transforms the primary device pairing event and releases the primary device certificate under control of the initial configuration logic;

control the microprocessor to retrieve the UDI from at least one other proximally positioned device, and the UES through the at least one wireless communications module upon detecting a pairing notification from the at least one other proximally positioned device, wherein the microprocessor is controlled by device pairing logic stored within the memory;

generate an asymmetric key pair for the at least one other proximally positioned device paired with the root trust device and storing the asymmetric key pair, the UDI, and the UES as a device pairing event in the paired device memory allocation, wherein the microprocessor is controlled by the device pairing logic, stored in the memory, to generate the asymmetric key pair and the store the device pairing event;

transform the asymmetric key pair into a certificate and releasing said certificate through the gateswitch to the at least one other proximally positioned device, wherein the microprocessor transforms and releases the certificate under control of a certificate authority management logic stored in the memory;

control the microprocessor to activate a recovery protocol in the memory on a new root trust device during the initial configuration state upon receiving a recovery notification signal comprising the primary device certificate from the proximally positioned device; and imprint the primary device certificate into the paired device memory allocation of the new root trust device upon matching the UES of the primary device certificate and the UES retrieved through the at least one wireless communications module through operations of the microprocessor controlled by the recovery protocol.

8. The computer system as claimed in claim 7 comprises:

encrypt device content on the proximally positioned device by multiplexing a device content signal with an asymmetric key of the certificate through operation of an encryptor, wherein operations of the encryptor are configured, at least in part, by user set policies;

decrypting the device content on the proximally positioned device by multiplexing an encrypted device content signal with a corresponding asymmetric key of a device specific certificate through operations of a decryptor, wherein operation of the decryptor is controlled, at least in part, by the proximal presence of the root trust device to the proximally positioned device; and decrypting the device content of a first proximally positioned device on a second proximally positioned device by multiplexing the encrypted device content signal with the corresponding asymmetric key of a shared certificate through operations of the decryptor of the second proximally positioned device, wherein operation of the decryptor is controlled, at least in part, by the proximal presence of the root trust device to the first proximally positioned device and the second proximally positioned device.

9. The computer system as claimed in claim 7, wherein the at least one wireless communications module comprise a short range communications module, where the short range communications module requires a device to be positioned proximally to the root trust device to transmit the UDI to the root trust device, encrypted device content between the proximally positioned devices, and a shared certificates from the root trust device to the proximally positioned devices.

10. The computer system as claimed in claim 7, comprises:

transmit the pairing notification to the root trust device from the proximally positioned device through operations of a device processor controlled by a pairing control signal derived from a coded image on the root trust device.

11. The computer system as claimed in claim 7, wherein the at least one wireless communications module detects the UES as a temporal/geolocation signal from a Wi-Fi based positioning system (WiPS).

12. The computer system as claimed in claim 7, wherein the at least one other proximally positioned device is a third party security trust device that shares its existing certificate library with the root trust device in order to confer existing certificates to another proximally positioned device.

* * * * *